Aug. 17, 1937.   N. R. BROWNYER   2,090,179
CAR WHEEL
Filed Aug. 19, 1933
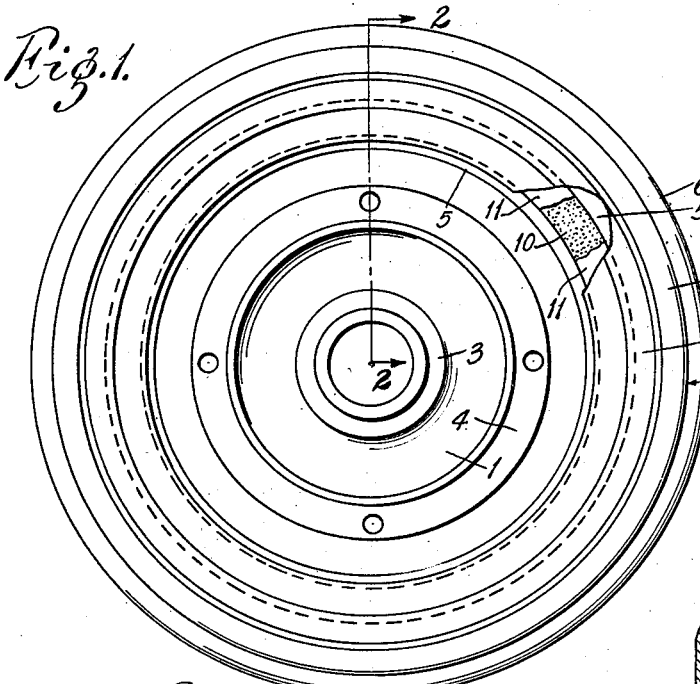
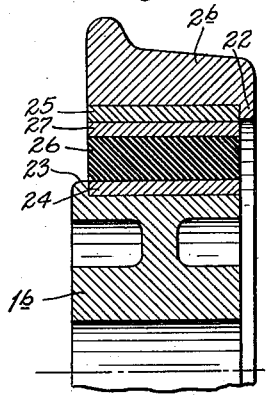
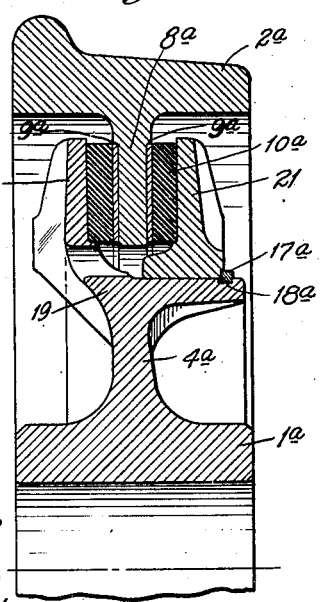
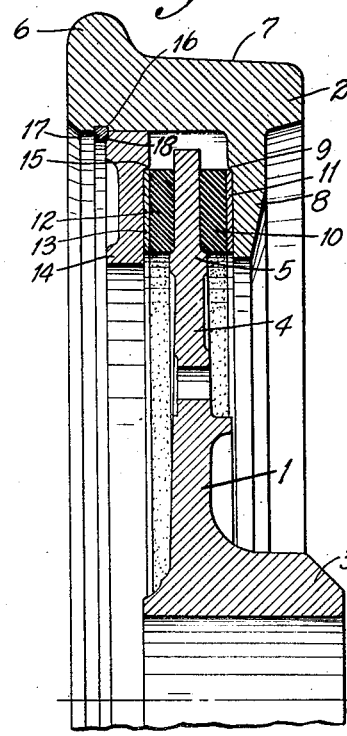
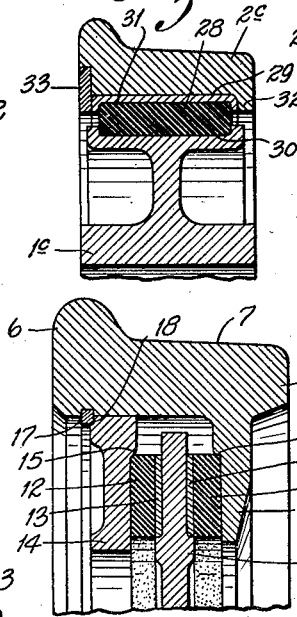
INVENTOR
HIS ATTORNEYS.

Patented Aug. 17, 1937

2,090,179

UNITED STATES PATENT OFFICE 2,090,179

CAR WHEEL

Nelson R. Brownyer, Detroit, Mich., assignor to The Timken-Detroit Axle Company, Detroit, Mich., a corporation of Ohio Application August 19, 1933, Serial No. 685,875

8 Claims. (Cl. 295—11)

My invention relates to wheels, especially car wheels of the type wherein rubber or like cushioning material is interposed between the metal rim member and the wheel center. The principal object of the invention is to protect the rubber from the effect of heat generated by the application of the brakes. The invention consists principally in interposing heat insulating material between the rubber cushioning material and the metal member which is heated by the application of the brake. It also consists in the combination and arrangement of parts hereinafter described and claimed.

In the accompanying drawing, wherein like reference numerals refer to like parts wherever they occur, Fig. 1 is a face view of a car wheel embodying my invention, Fig. 2 is an enlarged cross-sectional view of part of said wheel on the line 2—2 in Fig. 1, Fig. 3 is a similar cross-sectional view of a modification, which is adapted for use with a brake drum mounted on the wheel center.

Fig. 4 is a similar cross-sectional view of another modification, and

Figs. 5 and 6 are similar cross-sectional views of further modifications.

In the construction shown in Fig. 1, the wheel comprises a metal wheel center or hub 1 and a metal rim member or tire 2 with cushioning and heat insulating material interposed between them. The wheel center comprises a hub 3 with a wide disk-like web 4 that is provided with a beveled annular shoulder 5 located some distance inwardly from its outer periphery. The rim member 2 has a wheel flange 6 and tread 7 of usual contour; and it also has, near one end, a wide inwardly projecting annular flange 8. This annular flange also has a beveled shoulder 9 on its inner face near its base. The beveled shoulder 5 on the web is of somewhat larger diameter than the diameter of the inner edge of the flange on the rim member. The diameter of the beveled shoulder 9 on the flange of the rim member is somewhat less than the overall diameter of said web member. Interposed between the overlapping portions of the web of the wheel center and the inwardly extending flange of the rim member is a cushion of rubber in the form of a flat ring 10, one side of which bears flatwise directly against the web member. Between the other side of said cushion ring and the inwardly extending flange of the rim member is a thinner ring 11 of heat resisting material, such as asbestos. The radial width of these rings is preferably such that diagonally opposite edges thereof rest against the beveled shoulders 5 and 9 on the web and the rim flange, respectively.

Bearing against the opposite side of the web of the wheel is a similar ring 12 of rubber or like cushioning material with a ring 13 of asbestos or other suitable heat insulating material alongside of its outer face. This asbestos ring, in turn is in contact with a metal ring 14 whose outer periphery fits the bore of the rim member 2. Said metal ring 14 is wide enough radially to entirely overlap the asbestos ring and is provided with a beveled shoulder 15 on its inner face corresponding to the shoulder 9 on the inner face of the rim flange. An annular groove 16 is formed in the bore of the rim member. Seated therein is a split ring 17 whose inner corner fits in a recess 18 formed in the outer corner of the metal ring 14. Said groove 16 is so positioned that when the large metal ring 14 is forced inwardly against the resistance of the rubber, the locking ring 17 may be inserted in the groove, as by springing, and thereby serve to hold the parts against displacement. Under these conditions, the rubber may be compressed to any desired extent. Both the rubber and the heat insulating material have such frictional contact with the adjacent metal surfaces as to develop a considerable adhesive grip thereon. If desired, the rubber may be vulcanized directly to the web of the wheel center, and, in some cases, to the heat insulating material also.

In the modification illustrated in Fig. 3, the construction is the same as Fig. 1, except that the heat insulating material is interposed between the web of the wheel center and the rubber rings. This construction is designed for use when the brake is applied to a drum mounted on the web member. In such case the heat, against which the rubber is to be protected, is generated in the brake drum from which it is communicated to the web.

In the modified construction illustrated in Fig. 4, the rim member 2a has a wide inwardly projecting annular flange 8a located about midway of the length thereof, said flange being provided on both sides with annular shoulders 9a near the bore of said rim member. The wheel center 1a is formed with a relatively narrow web portion 4a whose periphery is widened longitudinally and radially to form an elongated cylinder 19 with a wide outwardly extending flange 20 at one end thereof and integral therewith and with said web. The outside diameter of said outwardly projecting flange is somewhat greater than the diameter of the beveled shoulders on the inwardly extending flange of the rim member. The inner face of said outwardly extending flange is provided with an annular shoulder of about the same or greater diameter than the inside diameter of said inwardly projecting rim flange. Fitted on the cylindrical portion of said wheel center is a wide annular ring 21 whose outside diameter is somewhat greater than the outside diameter of the rubber rings hereinafter mentioned. For the accommodation of the inner margin of the adjacent rubber ring 10a, a shoulder is formed on the inner face of said ring 21 near the base thereof. This wide ring 21 is held in place by means of a locking ring 17a provided therefor in a circumferential recess 18a near the outer end of said cylindrical portion. On each side of the flange 8a of the rim member is a ring of asbestos or other suitable heat insulating material, and next to each insulating ring is a rubber cushioning ring, whose outer face bears against the adjacent metal part of the wheel center construction, namely the integral flange 20 thereof or the wide ring 21 mounted on said wheel center and, in effect, constituting part thereof. In this construction, the heat insulating rings are interposed between the flange of the rim member and the rubber rings and thereby protect the rubber rings from the effect of heat generated by the action of the brake on the rim.

In the modification illustrated in Fig. 5, the wheel has a combined cushioning and heat insulating unit that has a press-fit between the metal wheel center 1b and the metal rim member 2b, said unit abutting at one end against a flange 22 on said member and at the other end against a flange 23 on said hub member. The combined cushioning and heat insulating unit comprises metal inner and outer rings 24 and 25, respectively, a ring 26 of rubber or like cushioning material interposed between said inner and outer rings, and a ring 27 of suitable heat insulating material interposed between said cushioning ring and the metallic outer ring 25.

In the modification illustrated in Fig. 6, a ring 28 of rubber or like cushioning material is interposed between the metal wheel center 1c and the rim member 2c; and a ring 29 of suitable heat insulating is interposed between the cushioning ring and the rim member. As shown in the drawing, the rubber cushioning ring 28 seats within annular channels 30 and 31 provided therefor in the wheel center 1c and heat insulating ring 29, respectively; said heat insulating ring abutting at one end against a flange 32 formed integral with said rim member and at the other end against a locking ring 33 seated in the adjacent end of said rim member. In assembling the parts, the cushioning and insulating rings are first assembled on the hub member and then pressed into the rim member.

While the invention is described above as applied to railway car wheels, it is obvious that it is clearly applicable to automobile wheels. Obviously, numerous other changes may be made without departing from the invention, and I do not wish to be limited to the precise details shown.

What I claim is:

1. A wheel comprising a metal wheel center having a disk-like web, a metal rim member having an inwardly extending flange near one end and overlapping the peripheral portion of said web, a wide metal ring mounted in the bore of said rim member, disk-like annular rings of cushioning material and of heat insulating material interposed between the marginal portion of said web on one hand and the flange and ring of said rim member, respectively, on the other hand, the heat insulating rings being disposed next to said web thereby completely isolating said cushioning rings from said rim member, said heat insulating rings being considerably thinner than said cushioning rings.

2. A wheel comprising a metal wheel center having a disk-like web, a metal rim member having an inwardly extending flange near one end and overlapping the peripheral portion of said web, a wide metal ring mounted in the bore of said rim member, disk-like annular rings of cushioning material and of heat insulating material interposed between the marginal portion of said web on one hand and the flange and ring of said rim member, respectively, on the other hand, the heat insulating rings being disposed next to said flange and said ring, respectively thereby completely isolating said cushioning rings from said rim member, said heat insulating rings being considerably thinner than said cushioning rings.

3. A wheel comprising a metal wheel center having a disk-like web with shoulders on both sides thereof located inwardly from its periphery, a metal rim member having an inwardly extending flange near one end overlapping the peripheral portion of said web, a wide ring mounted in the bore of said rim member, said flange and ring having shoulders of greater diameter than said first mentioned shoulders, rings of cushioning material and of heat insulating material interposed between the marginal portion of said web and the flange and ring of said rim member with their corners adjacent said shoulders.

4. A wheel comprising a metal wheel center and a metal rim member with radially overlapping parts, rings of rubber interposed between said overlapping parts and vulcanized to the metal parts on one side thereof, and rings of heat insulating material between said rubber rings and the metal parts on the other side of said rubber rings.

5. In a car wheel, a metallic wheel center member providing a pair of spaced neighboring disk-like annular surfaces that are substantially parallel and define an annular chamber; a metallic rim member concentrically disposed with respect to said center member and having an inwardly extending flange disposed within said chamber, the portion of said flange disposed within said chamber providing a disk-like annular surface on each side thereof; and cushioning elements and heat insulating elements frictionally disposed between said center and rim member annular surfaces, said elements being of disk-like configuration and said heat insulating element being relatively thin as compared to said cushioning element, said heat insulating element being of substantially uniform thickness from side to side.

6. In a car wheel, a metallic wheel center member having a smooth annular frictional surface; a metallic rim member having a smooth annular frictional surface, said frictional surfaces being spaced apart; a cushioning ring assembly, comprising a resilient deformable element, disposed in surface engagement between the frictional surfaces of said members and being in a state of considerable compression for supporting said parts solely in shear; at least one of said members having an annular shoulder provided thereon radially beyond the outer edge of said ring and projecting beyond the surface of said annular frictional surface.

7. A wheel comprising, in combination, a wheel body, a hub having a grooved portion thereon, a resilient member, and a heat-resisting member, said resilient member and said heat-resisting member being interposed between said wheel body and said hub so as to laterally support said wheel body on opposite sides thereof in such a position that the inner diametral edge thereof is substantially concentrically spaced from the grooved portion of said hub.

8. A wheel assembly, including a wheel body, resilient members on either side of said wheel body for supporting the latter, and heat-resisting means between said resilient members and said wheel body for preventing the transmission of heat therebetween, said heat-resisting means being adapted to center said wheel body with respect to said resilient members.

NELSON R. BROWNYER.